United States Patent
Khawand

(10) Patent No.: US 7,212,542 B2
(45) Date of Patent: May 1, 2007

(54) METHOD AND APPARATUS FOR MAXIMIZING A DATA RATE OF A WIRELESS DATA COMMUNICATION SYSTEM

(75) Inventor: Jean Khawand, Miami, FL (US)

(73) Assignee: Motorola, Inc., Schaumburg, IL (US)

( * ) Notice: Subject to any disclaimer, the term of this patent is extended or adjusted under 35 U.S.C. 154(b) by 961 days.

(21) Appl. No.: 10/408,985

(22) Filed: Apr. 8, 2003

(65) Prior Publication Data

US 2004/0202134 A1   Oct. 14, 2004

(51) Int. Cl.
H04J 15/00 (2006.01)
H04B 1/00 (2006.01)
H04B 1/02 (2006.01)

(52) U.S. Cl. ............ 370/464; 370/480; 370/538; 370/208; 370/332; 375/144; 455/103; 455/102; 455/67.11

(58) Field of Classification Search .......... 370/464, 370/480, 538, 208, 332, 333; 375/144; 455/102, 455/103; 714/748
See application file for complete search history.

(56) References Cited

U.S. PATENT DOCUMENTS

| 5,487,072 | A | * | 1/1996 | Kant | 714/748 |
| 5,898,696 | A | | 4/1999 | Proctor et al. | 370/468 |
| 6,035,196 | A | * | 3/2000 | Hengeveld et al. | 455/437 |
| 6,144,646 | A | | 11/2000 | Bohlmann et al. | 370/311 |
| 6,400,731 | B1 | | 6/2002 | Nitta | 370/468 |
| 6,529,730 | B1 | * | 3/2003 | Komaili et al. | 455/452.2 |
| 6,721,569 | B1 | * | 4/2004 | Hashem et al. | 455/450 |
| 7,020,073 | B2 | * | 3/2006 | Kadous et al. | 370/208 |
| 7,130,587 | B2 | * | 10/2006 | Hikokubo et al. | 455/67.11 |
| 2002/0046379 | A1 | * | 4/2002 | Miki et al. | 714/749 |
| 2003/0063587 | A1 | * | 4/2003 | Cho et al. | 370/335 |
| 2004/0203455 | A1 | * | 10/2004 | Bao et al. | 455/67.13 |

* cited by examiner

Primary Examiner—Duc M. Nguyen

(57) ABSTRACT

A first transceiver (200) sends (102) a predetermined number of blocks of data to a second transceiver, and records (104) on which of a plurality of sub-carriers each of the blocks of data is sent. The first transceiver receives (106) from the second transceiver a list of the blocks of data that were received with errors, and calculates (108) from the list a plurality of error rates corresponding to the plurality of sub-carriers. The first transceiver then determines (110) the SQE for each of the plurality of sub-carriers from the plurality of error rates, and adjusts (112) the data rate in accordance with the SQE determined for each of the plurality of sub-carriers. These processes can be implemented as a method that is facilitated by a software program.

21 Claims, 2 Drawing Sheets

METHOD AND APPARATUS FOR MAXIMIZING A DATA RATE OF A WIRELESS DATA COMMUNICATION SYSTEM

FIELD OF THE INVENTION

This invention relates in general to wireless data communication systems, and more specifically to a method and apparatus for maximizing a data rate of a wireless data communication system.

BACKGROUND OF THE INVENTION

The desire for increased transmission data rates in today's wireless data communication systems has led some systems to a technique of sending data over multiple parallel sub-carriers simultaneously, each sub-carrier having its own dedicated carrier frequency. In such prior-art multi-sub-carrier systems, it has been the practice for a first transceiver to send an amount of data to a second transceiver, after which the second transceiver makes multiple signal quality estimates (SQEs) corresponding to the signal received on each of the multiple sub-carriers. The second transceiver then reports the multiple SQEs to the first transceiver, which then accordingly adjusts the data rate of a subsequent transmission to the maximum consistent with the reported SQEs.

The prior-art technique presents two problems. The first problem is that measuring the SQE on all sub-carriers simultaneously can consume more processing power than may be readily available in the second transceiver. The second problem is that feeding back the SQE results from the second transceiver to the first transceiver requires bandwidth on the reverse link. Bandwidth that is allocated to SQE data represents an undesirable overhead.

Thus, what is needed is a method and apparatus for maximizing the data rate of a wireless data communication system. Preferably, the method and apparatus will maximize the data rate without requiring the second transceiver to measure and communicate a signal quality estimate (SQE) for each of the plurality of sub-carriers.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE PREFERRED EMBODIMENTS

In overview, the present disclosure concerns wireless data communications systems that utilize transceivers to provide service for users thereof operating therein. More particularly, various inventive concepts and principles embodied as a method and apparatus for maximizing a data rate of a wireless data communication system for use in equipment with such communications systems will be discussed and disclosed. The communications systems of particular interest are those being deployed and developed such as Wideband Integrated Dispatch Enhanced Network systems manufactured by Motorola, Inc. and evolutions thereof that utilize multiple sub-carriers and multiple modulation formats, although the concepts and principles have application in other systems and devices, as well.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in one or more conventional digital signal processors (DSPs), or with integrated circuits (ICs) such as custom or application specific ICs. It is expected that one of ordinary skill, notwithstanding possibly significant effort and many design choices motivated by, for example, available time, current technology, and economic considerations, when guided by the concepts and principles disclosed herein will be readily capable of programming such DSPs, or generating such ICs with minimal experimentation. Therefore, in the interest of brevity and minimization of any risk of obscuring the principles and concepts according to the present invention, further discussion of such DSPs and ICs, if any, will be limited to the essentials with respect to the principles and concepts employed by the preferred embodiments.

Figure 1:
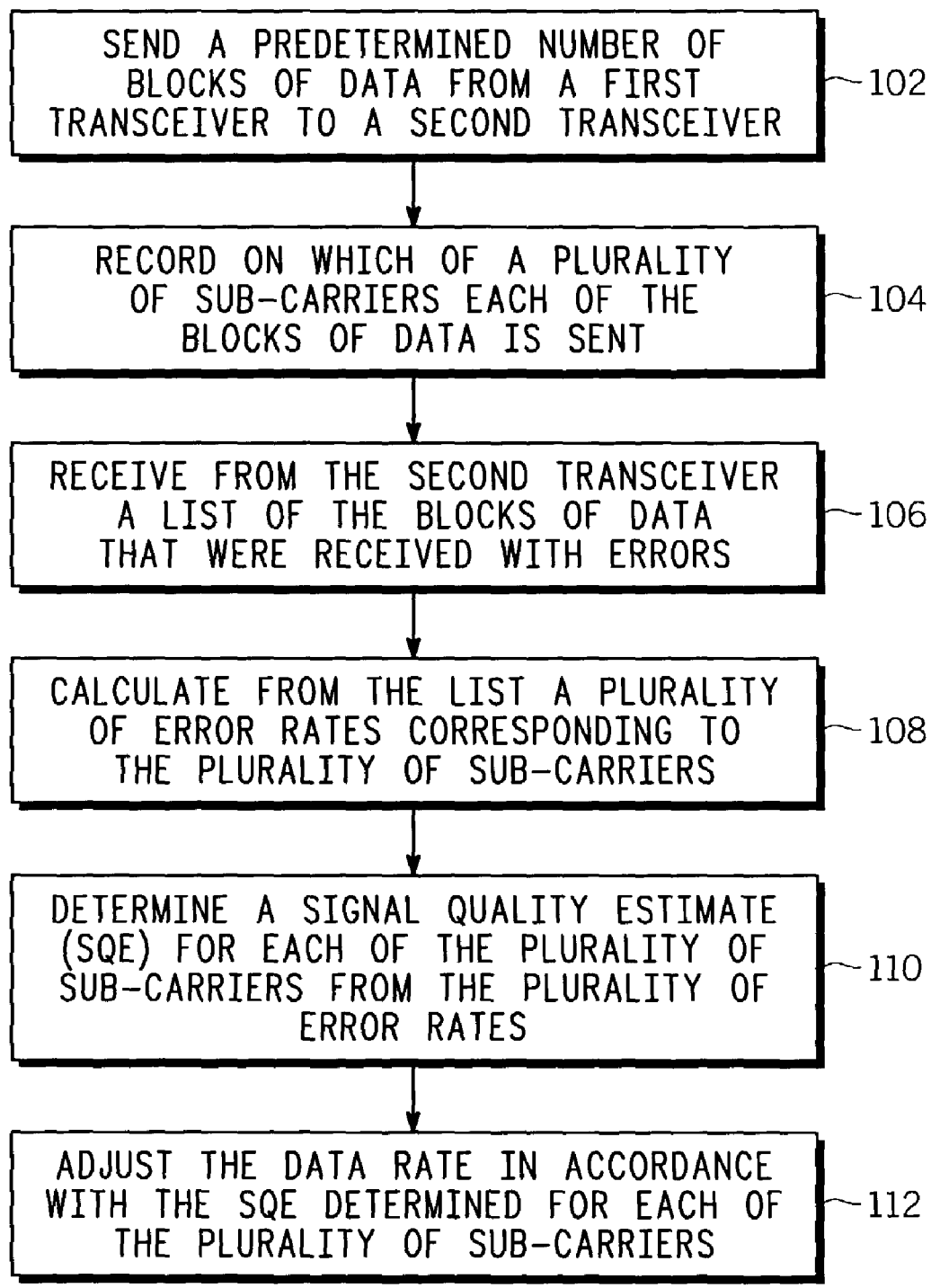
FIG. 1 is a flow diagram of a method for maximizing a data rate of a wireless data communication system.

Briefly, referring to FIG. 1, a flow diagram depicts a method for maximizing a data rate of a wireless data communication system. The flow begins with sending 102 a predetermined number of blocks of data from a first transceiver to a second transceiver in a wireless communication system that sends the data through a plurality of sub-carriers at once. When sending the data, the first transceiver preferably records 104 on which of the plurality of sub-carriers each of the blocks of data is sent, as well as which one of a plurality of possible modulation formats is used for the transmission. The first transceiver then receives 106 from the second transceiver a list of the blocks of data that were received with errors, preferably using a well-known Selective Automatic Repeat reQuest (S-ARQ) technique. The first transceiver preferably also measures and stores, through well-known techniques, a Received Signal Strength Indication (RSSI) while receiving the transmission from the second transceiver. The first transceiver then calculates 108 from the list of blocks a plurality of error rates corresponding to the plurality of sub-carriers. The first transceiver then determines 110 a Signal Quality Estimate (SQE) for each of the plurality of sub-carriers from the plurality of error rates.

In a first embodiment, the first transceiver has a plurality of pre-stored lookup tables mapping the error rate into a corresponding SQE, each table specific to a modulation format and further specific to an RSSI. The first transceiver then selects one of the pre-stored tables, based upon the modulation format utilized for sending the blocks of data to the second transceiver, and further based upon an RSSI measured while receiving the transmission from the second transceiver. The first transceiver then locates, for each sub-carrier, the SQE value corresponding to the error rate of the sub-carrier in the selected one of the pre-stored tables selected for the sub-carrier to determine the SQE. This embodiment does not require that any SQE information be determined or sent by the second transceiver, thereby advantageously saving both processing power and transmission overhead. Operation of the first embodiment will be described further herein below.

In a second embodiment, the second transceiver calculates and sends to the first transceiver a single, average SQE measurement following the receipt of the predetermined number of blocks of data from the first transceiver. The first transceiver then calculates the SQE for each of the plurality of sub-carriers from the average SQE measurement and the plurality of error rates corresponding to the plurality of sub-carriers. Operation of the second embodiment will be described further herein below.

Next, the first transceiver adjusts 112 the data rate for a subsequent transmission in accordance with the SQE determined for each of the plurality of sub-carriers. Adjusting the data rate preferably includes selecting a modulation format (e.g., 64 QAM, 16 QAM, or QPSK) and selecting a bandwidth, i.e., deciding how many of the plurality of carriers to utilize. In one embodiment, adjusting the data rate includes calculating, for each of a plurality of modulation formats, a total number of blocks transmitted in a frame utilizing the modulation format; and selecting one of the plurality of modulation formats that produces a highest total number of blocks. Bandwidth and modulation format selection also will be described further herein below.

Figure 2:
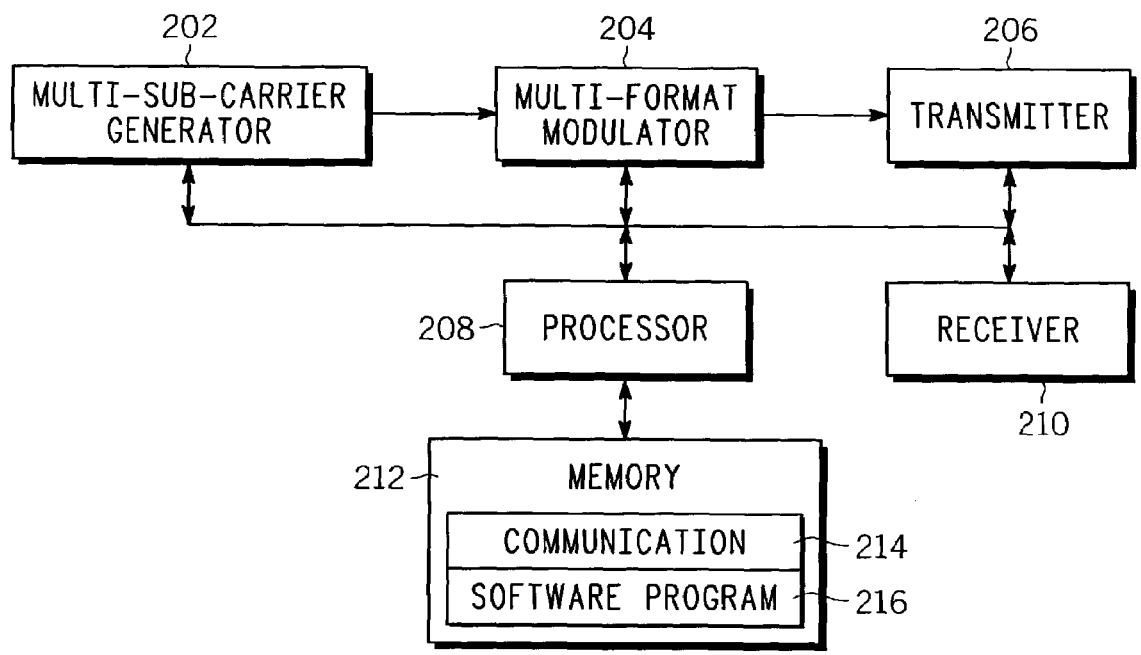
FIG. 2 is an electrical block diagram of an exemplary transceiver for maximizing the data rate.

FIG. 2 is an electrical block diagram of an exemplary transceiver 200 for maximizing the data rate. The transceiver 200 can be, for example, part of a fixed network base station, or part of a portable subscriber unit. The transceiver 200 comprises a processor 208 for controlling the transceiver 200. The transceiver 200 further comprises a multi-sub-carrier generator 202 coupled to the processor 208 for generating the plurality of sub-carriers, and a multi-format modulator 204 coupled to the processor 208 and coupled to the multi-sub-carrier generator 202 for modulating the plurality of sub-carriers to send the data at the selected data rate. The transceiver 200 also includes a conventional transmitter 206 coupled to the processor 208 and coupled to the multi-format modulator 204 for sending the predetermined number of blocks of data to the second transceiver (not shown, but similar to the transceiver 200). In addition, the transceiver 200 includes a conventional receiver 210 coupled to the processor for receiving communications from the second transceiver. The transceiver 200 further comprises a memory 212 coupled to the processor 208 for storing operating variables and software for programming, specifically execution by the processor 208. The memory 212 comprises a communication element 214 for programming, specifically execution by the processor 208 to carry out the communications of the transceiver 200 through well-known techniques. The memory 212 further comprises a software program 216 for programming the processor 208 to maximize the data rate in accordance with the present invention. It will be appreciated that some or all of the elements 202–212 can be combined in one or more custom integrated circuits, or realized in a conventional digital signal processor, given the information herein disclosed.

Figure 3:
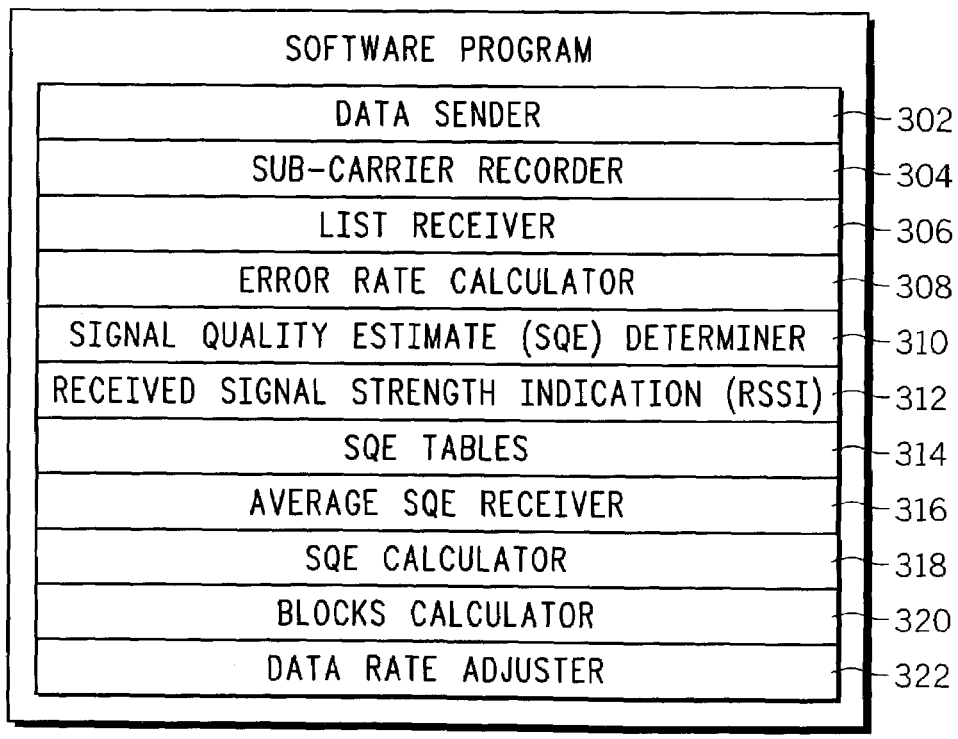
FIG. 3 is a diagram depicting elements of an exemplary software program for programming a processor in a transceiver to maximize the data rate.

FIG. 3 is an exemplary diagram depicting elements of the software program 216. The software program 216 comprises a data sender 302 for programming the processor 208 to control the transceiver 200 to send a predetermined number of blocks of data to the second transceiver, and a sub-carrier recorder 304 for programming the processor 208 to record on which of the plurality of sub-carriers each of the blocks of data is sent. The software program 216 further comprises a list receiver 306 for programming the processor 208 to control the transceiver 200 to receive from the second transceiver a list of the blocks of data that were received with errors, and an error rate calculator 308 for programming the processor 208 to calculate from the list a plurality of error rates corresponding to the plurality of sub-carriers. The software program 216 also includes an SQE determiner 310 for programming the processor 208 to determine the SQE for each of the plurality of sub-carriers from the plurality of error rates, and an RSSI element 312 for programming the processor 208 to measure and save the RSSI while receiving a transmission from the second transceiver. In addition, the software program 216 includes SQE tables 314 used by the SQE determiner 310 to determine the SQE from the error rate, as outlined herein above for the first embodiment. In the second embodiment, the software program 216 includes an average SQE receiver 316 for programming the processor 208 to receive from the second transceiver an average SQE measurement, and an SQE calculator 318 for programming the processor 208 to calculate the SQE from the average SQE measurement and the plurality of error rates corresponding to the plurality of sub-carriers.

In addition, the software program 216 includes a blocks calculator 320 for calculating, for each of a plurality of usable modulation formats, a total number of blocks transmitted in a frame utilizing the modulation format, and a data rate adjuster 322 for selecting one of the plurality of modulation formats that produces a highest total number of blocks. In addition, in a system such as Wideband integrated digital enhanced network that requires all sub-carriers to operate with the same modulation format at any given time, the data rate adjuster 322 programs the processor 208 to activate only the sub-carriers that have an SQE that is adequate for transporting the selected one of the plurality of modulation formats.

In somewhat greater detail, the following paragraphs will further explain the various embodiments for maximizing throughput of data transmission in a system utilizing a wideband signal. For concreteness, the example systems are explained in the context of a four-sub-carrier Wideband integrated digital enhanced network system but may be applied to other types of wideband systems utilizing different numbers of sub-carriers.

In a Wideband integrated digital enhanced network system, the wideband channel is divided into multiple sub-carriers (frequency division), where blocks of data are modulated and transmitted over the multiple sub-carriers. The modulation format for the transmission is set based on the signal quality (e.g., the signal-to-noise ratio) of the wideband signal. The higher the link signal quality estimate (SQE), the denser the modulation constellation is set (e.g., 64 QAM instead of 16 QAM), yielding a higher data throughput.

A problem occurs in trying to estimate the link SQE by the transmitting entity, i.e., the first transceiver. The SQE can, of course, be measured by the receiving entity, i.e., the second transceiver, and then relayed back to the first transceiver in a full duplex/or half duplex system. As discussed briefly in the Background, however, measuring and reporting the SQE on each sub-carrier has two challenges:

1—Measuring the SQE on all 4 sub-carriers simultaneously consumes processing power which may not be available in the second transceiver.

2—Feeding back the SQE results from the second transceiver to the first transceiver requires bandwidth on the reverse link. Bandwidth that is allocated to SQE data represents an undesirable overhead.

The first and second embodiments described herein above provide for the transmitting entity (i.e., the first transceiver) to estimate the SQE on its transmit link and adapt the modulation format accordingly.

The first embodiment advantageously requires no explicit feedback from the second transceiver to the first transceiver about the SQE. The first transceiver estimates the SQE based on the layer-two data transmission reported errors. The first transceiver transmits a Medium Access Layer Normal Transmission Unit (MAC NTU) consisting of several blocks of transmitted data, using an initial modulation format. The first transceiver records on which sub-carrier each block is transmitted.

The second transceiver receives the data and sends back to the first transceiver a list of blocks that are received with errors in the form of a Selective Automatic Retransmission reQuest (S-ARQ). (In the prior-art system, the transmitting entity only uses the S-ARQ information to retransmit the blocks received with errors.) In the first embodiment, the first transceiver uses the S-ARQ feedback and the first transceiver's records concerning on which sub-carrier each block was transmitted, to derive an estimate of the SQE on each sub-carrier. This preferably is done as follows:

Let $N_i$ be the number of blocks transmitted on each sub-carrier, where i corresponds to sub-carrier numbers 1 to 4.

Let $E_i$ be the number of error blocks on each sub-carrier (1 to 4).

The ratio $E_i/N_i*100$ represents a percentage Block Error Rate on each sub-carrier.

The Block Error Rate is mapped into an SQE estimate of each sub-carrier based on the current modulation format. The mapping from SQE to Block Error Rate is preferably done using a table lookup, where a table is selected based on the modulation format utilized by the first transceiver and on the RSSI measured by the first transceiver while receiving a communication from the second transceiver. The lookup tables are pre-stored in the first transceiver and are empirically derived in a laboratory environment.

Once the SQE is estimated for each sub-carrier, the first transceiver uses the results to adjust both the BW and the modulation format. Keeping in mind that the objective is to increase the throughput (or transmit the data as quickly as possible and release the channel for other users), the first transceiver will need to find a balance between the bandwidth and modulation format. For instance, if only one sub-carrier has a mediocre SQE due to a particular interferer in its band, it may be better to remove it and use only three sub-carriers but with a denser modulation constellation. The method for setting the bandwidth and modulation will be explained further herein below.

The second embodiment uses an average full signal SQE measurement reported back to the first transceiver to estimate the individual sub-carrier SQEs. This method advantageously reduces the bandwidth required for reporting SQE measurements back to the first transceiver, compared to the prior-art method. Instead of reporting an SQE measurement for each sub-carrier, the second transceiver reports only the average SQE, and the first transceiver uses the block error rates that are readily available to estimate the SQE on each sub-carrier. This may be done in several ways. A preferred method is as follows:

Let SQEavg be the full bandwidth SQE. $SQE_i$, which represents the SQE for sub-carrier i is derived as follows:

The average SQE selects a point in a pre-stored SQE-to-block-error-rate curve saved in the first transceiver. The sub-carriers are ordered in ascending block error rate: C1-C2-C3-C4, where the corresponding error rates are E1, E2, E3, E4.

Starting from the average SQE value, the Δ1 to Δ3 SQE value differences corresponding to (E2–E1), (E3–E2), and (E4–E3) are obtained from the curve, and SQEi values are computed as follows:

$$SQE1 = SQE2 + \Delta1 \quad (1)$$

$$SQE2 = SQE3 + \Delta2 \quad (2)$$

$$SQE3 = SQE4 + \Delta3 \quad (3)$$

$$SQE4 = SQE4$$

We now have:

$$SQE\ avg = \Sigma SQEi/4 = [SQE4 + (SQE4 + \Delta3) + (SQE4 + \Delta3 + \Delta2) + (SQE4 + \Delta3 + \Delta2 + \Delta1)]/4$$

The preceding equation is solved for $SQE4 = [SQEavg - (3\Delta3 + 2\Delta2 + \Delta1)]/4$, and the SQE1 to SQE3 values follow from equations (1) to (3). The estimates SQE1 to SQE4 are then used to set the bandwidth and modulation as described herein below. This process preferably is repeated for each transmission.

The following technique for setting the bandwidth (number of sub-carriers) and the modulation format assumes that SQE estimates (or exact SQE measurements) for each of the sub-carriers have been determined. This technique applies to the case where all sub-carriers are required to have the same modulation format. (If each sub-carrier could independently transmit at any modulation rate, then this problem is simple and is solved by setting the maximum modulation format corresponding to the estimated SQE for the sub-carrier.)

In the case where all sub-carriers must have the same modulation format (as in a Wideband integrated digital enhanced network), the technique is specified as follows. Determine the maximum modulation for each sub-carrier from the corresponding SQE estimate. Then for each possible maximum modulation, compute the number of transmitted blocks normalized to a predetermined channel interleave. For Wideband integrated digital enhanced network, a Dynamic Channel Allocation Procedure (DCAP) time slot carries data defining how the time slots of the upcoming frame are to be used. The technique proceeds as follows:

Let NBMi be the number of blocks that fit into each time slot for a given modulation (i). Those constants are computed from the modulation format. For instance, in WiDEN, for 64 QAM, 4 blocks will fit into a time slot, where only 2 will fit for 16 QAM and only 1 for QPSK.

Let ASCj correspond to the time slots that are available for data transmission on sub-carrier (j) within the channel interleave. (For WiDEN, different sub-carriers will have different DCAP frames).

The total number of blocks transmitted per channel interleave is given by:

$NB = \Sigma_j (NBMi * ASCj)$. Chose the modulation rate and the number of sub-carriers that yield the highest NB. If a tie exists, chose the modulation rate that uses the smallest number of sub-carriers.

For example:

Assume there are 4 sub-carriers with the following maximum modulation formats:

$C1=NBM1=4$; (64 QAM)

$C2=NBM2=2$; (16 QAM)

$C3=NBM2=2$; (16 QAM)

$C4=NBM3=1$; (QPSK), and further assume that:

ASC1=5; 5 slots per DCAP frame

ASC2=10; 10 slots per DCAP frame

ASC3=10; 10 slots per DCAP frame

ASC4=5; 5 slots per DCAP frame.

Then:

NB(64 QAM)=NBM1*ASC1=4*5=20. Only sub-carrier one may be used.

NB(16 QAM)=NBM2*ASC1+NBM2*ASC2+ NBM2*ASC3=2*5+2*10+2*10=50.

NB(QPSK)=$NBM3$*(ASC1+ASC2+ASC3+ASC4)= (5+10+10+5)=30.

In this case, we would select 16 QAM and 4 sub-carriers, because that combination would send the greatest number of blocks per channel interleave.

As a second example, let ASC1=6, ASC2=3, and ASC3=3. Then we have the following:

NB(64 QAM)=NBM1*ASC1=4*6=24 Only sub-carrier one may be used.

NB(16 QAM)=NBM2*ASC1+NBM2*ASC2+ NBM2*ASC3=2*6+2*3+2*3=24

NB(QPSK)=NBM3*(ASC1+ASC2+ASC3+ASC4)= (6+4+4+5)=19

In this case we would choose 64 QAM and only one sub-carrier.

Once a sub-carrier has been eliminated and the BW reduced, then the SQE and the block error rate are no longer available for that sub-carrier. It may be possible that an interferer on that sub-carrier will go away and its SQE will improve. The following algorithm is used so that the sub-carrier is not permanently removed but is re-activated and re-evaluated when one of the following occurs:

1—After a predetermined amount of time has passed.

2—When the first transceiver receives feedback of an improved SQE on the sub-carrier from another transceiver sharing the same frequency.

3—When the first transceiver receives feedback on improved RSSI on the remaining sub-carriers.

Thus, it should be clear from the preceding disclosure that the present invention provides a method and apparatus in a wireless data communication system for maximizing the data rate. The method and apparatus advantageously maximizes the data rate without requiring a second transceiver to measure and communicate a signal quality estimate for each of a plurality of sub-carriers.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A method in a wireless data communication system that sends data from a first transceiver to a second transceiver at a data rate through a plurality of sub-carriers at once, the method for maximizing the data rate without requiring the second transceiver to measure and communicate a signal quality estimate (SQE) for each of the plurality of sub-carriers, the method comprising in the first transceiver:

sending a predetermined number of blocks of data to the second transceiver;

recording on which of the plurality of sub-carriers each of the blocks of data is sent;

receiving from the second transceiver a list of the blocks of data that were received with errors;

calculating from said list a plurality of error rates corresponding to the plurality of sub-carriers;

determining the SQE for each of the plurality of sub-carriers from the plurality of error rates; and adjusting the data rate in accordance with the SQE determined for each of the plurality of sub-carriers.

2. The method of claim 1, wherein determining the SQE comprises:

selecting one of a plurality of pre-stored tables mapping an error rates into a corresponding SQE, based upon a modulation format utilized for sending the predetermined number of blocks of data to the second transceiver; and determining the SQE from the one of the plurality of pre-stored tables.

3. The method of claim 1, wherein determining the SQE comprises:

selecting one of a plurality of pre-stored tables mapping an error rate into a corresponding SQE, based upon a received signal strength indication (RSSI) measured while receiving a transmission from the second transceiver; and determining the SQE from the one of the plurality of pre-stored tables.

4. The method of claim 1, further comprising:

receiving from the second transceiver an average SQE measurement, and wherein determining the SQE comprises calculating the SQE from the average SQE measurement and the plurality of error rates corresponding to the plurality of sub-carriers.

5. The method of claim 1, wherein adjusting the data rate comprises selecting a modulation format.

6. The method of claim 1, wherein adjusting the data rate comprises selecting a bandwidth.

7. The method of claim 1, wherein adjusting the data rate comprises:
calculating, for each one of a plurality of modulation formats, a total number of blocks transmitted in a frame utilizing the one of a plurality of modulation formats; and
selecting a specific one of the plurality of modulation formats that produces a highest total number of blocks.

8. A first transceiver in a wireless data communication system that sends data to a second transceiver at a data rate through a plurality of sub-carriers at once, the first transceiver maximizing the data rate without requiring the second transceiver to measure and communicate a signal quality estimate (SQE) for each of the plurality of sub-carriers, the first transceiver comprising:
a processor for controlling the first transceiver;
a multi-carrier generator coupled to the processor for generating the plurality of sub-carriers;
a multi-format modulator coupled to the processor and coupled to the multi-carrier generator for modulating the plurality of sub-carriers to send the data at the data rate;
a transmitter coupled to the processor and coupled to the multi-format modulator for sending a predetermined number of blocks of data to the second transceiver;
a memory coupled to the processor for recording on which of the plurality of sub-carriers each of the blocks of data is sent;
a receiver coupled to the processor for receiving from the second transceiver a list of the blocks of data that were received with errors, wherein the processor is programmed to:
calculate from said list a plurality of error rates corresponding to the plurality of sub-carriers;
determine the SQE for each of the plurality of sub-carriers from the plurality of error rates; and
adjust the data rate in accordance with the SQE determined for each of the plurality of sub-carriers.

9. The first transceiver of claim 8, wherein the processor is further programmed to:
select one of a plurality of pre-stored tables mapping an error rate into a corresponding SQE, based upon a modulation format utilized for sending the predetermined number of blocks of data to the second transceiver; and
determine the SQE from the one of the plurality of pre-stored tables.

10. The first transceiver of claim 8, wherein the processor is further programmed to:
cooperate with the receiver to measure a received signal strength indication (RSSI) while receiving a transmission from the second transceiver
select one of a plurality of pre-stored tables mapping an error rate into a corresponding SQE, based upon the RSSI; and
determine the SQE from the one of the plurality of pre-stored tables.

11. The first transceiver of claim 8, wherein the processor is further programmed to:
cooperate with the receiver to receive from the second transceiver an average SQE measurement, and
calculate the SQE from the average SQE measurement and the plurality of error rates corresponding to the plurality of sub-carriers.

12. The first transceiver of claim 8, wherein the processor is further programmed to
cooperate with the multi-format modulator to adjust the data rate by selecting a modulation format.

13. The first transceiver of claim 8, wherein the processor is further programmed to
cooperate with the multi-carrier generator to adjust the data rate by selecting a bandwidth.

14. The first transceiver of claim 8, wherein the processor is further programmed to:
calculate, for each one of a plurality of modulation formats, a total number of blocks transmitted in a frame utilizing the one of a plurality of modulation formats; and
select a specific one of the plurality of modulation formats that produces a highest total number of blocks.

15. A software program that when installed and executing on a processor causes the processor to control a first transceiver in a wireless data communication system to send data to a second transceiver at a data rate through a plurality of sub-carriers at once, the software program controlling the first transceiver to maximize the data rate without requiring the second transceiver to measure and communicate a signal quality estimate (SQE) for each of the plurality of sub-carriers, the software program further controlling the first transceiver to:
send a predetermined number of blocks of data to the second transceiver;
record on which of the plurality of sub-carriers each of the blocks of data is sent;
receive from the second transceiver a list of the blocks of data that were received with errors,
calculate from said list a plurality of error rates corresponding to the plurality of sub-carriers;
determine the SQE for each of the plurality of sub-carriers from the plurality of error rates; and
adjust the data rate in accordance with the SQE determined for each of the plurality of sub-carriers.

16. The software program of claim 15, further controlling the first transceiver to:
select one of a plurality of pre-stored tables mapping an error rate into a corresponding SQE, based upon a modulation format utilized for sending the predetermined number of blocks of data to the second transceiver; and
determine the SQE from the one of the plurality of pre-stored tables.

17. The software program of claim 15, further controlling the first transceiver to:
measure a received signal strength indication (RSSI) while receiving a transmission from the second transceiver;
select one of a plurality of pre-stored tables mapping an error rate into a corresponding SQE, based upon the RSSI; and
determine the SQE from the one of the plurality of pre-stored tables.

18. The software program of claim 15, further controlling the first transceiver to:
receive from the second transceiver an average SQE measurement, and calculate the SQE from the average SQE measurement and the plurality of error rates corresponding to the plurality of sub-carriers.

19. The software program of claim 15, further controlling the first transceiver to adjust the data rate by selecting a modulation format.

20. The software program of claim 15, further controlling the first transceiver to adjust the data rate by selecting a bandwidth.

21. The software program of claim 15, further controlling the first transceiver to:

calculate, for each one of a plurality of modulation formats, a total number of blocks transmitted in a frame utilizing the one of the plurality of modulation formats; and select a specific one of the plurality of modulation formats that produces a highest total number of blocks.

* * * * *